(12) United States Patent
Daniels

(10) Patent No.: US 6,643,971 B2
(45) Date of Patent: Nov. 11, 2003

(54) WATERFOWL FEEDING DECOY

(76) Inventor: Gregg Daniels, 3301 Foxboro Rd., Fort Smith, AR (US) 72903

( * ) Notice: Subject to any disclaimer, the term of this patent is extended or adjusted under 35 U.S.C. 154(b) by 0 days.

(21) Appl. No.: 09/839,014

(22) Filed: Apr. 20, 2001

(65) Prior Publication Data

US 2002/0178639 A1 Dec. 5, 2002

(51) Int. Cl.$^7$ ............................................. A01M 31/06
(52) U.S. Cl. ............................................................ 43/3
(58) Field of Search ................................. 43/2, 3, 26.1

(56) References Cited

U.S. PATENT DOCUMENTS

| | | | |
|---|---|---|---|
| 740,293 A | * 9/1903 | Loeble | 43/3 |
| 2,434,335 A | * 1/1948 | Signalness | 43/3 |
| 2,457,295 A | * 12/1948 | Woodhead | 43/3 |
| 2,460,128 A | 1/1949 | Greenleaf | 43/3 |
| 2,754,609 A | * 7/1956 | Schultz | 43/17 |
| 2,793,456 A | * 5/1957 | Argo | 43/3 |
| 2,814,898 A | * 12/1957 | Fluke | 43/3 |
| 3,000,128 A | 9/1961 | McAda | 43/3 |
| 3,074,195 A | 1/1963 | Vanderpool | |
| 3,115,721 A | 12/1963 | Story | 43/3 |
| 3,689,927 A | 9/1972 | Boston | |
| 3,927,485 A | * 12/1975 | Thorsnes, Jr. | 43/3 |
| 4,539,772 A | * 9/1985 | Forbes et al. | 43/3 |
| 4,566,214 A | 1/1986 | McCrory et al. | |
| 5,377,439 A | 1/1995 | Roos et al. | 43/3 |
| 5,566,491 A | 10/1996 | Phillips | 43/3 |
| 5,608,984 A | 3/1997 | Schaffer | |
| 5,636,466 A | * 6/1997 | Davis | 43/3 |
| 5,809,683 A | * 9/1998 | Solomon | 43/3 |
| 5,926,990 A | 7/1999 | Okimoto | |
| 5,930,936 A | 8/1999 | Parr et al. | 43/3 |
| 5,974,720 A | 11/1999 | Bowling | |
| 6,079,140 A | * 6/2000 | Brock, IV | 43/3 |
| 6,088,944 A | 7/2000 | Jones | |
| 6,092,323 A | * 7/2000 | McBride et al. | 43/3 |
| 6,170,188 B1 | * 1/2001 | Mathews | 43/3 |
| 6,212,816 B1 | 4/2001 | Babbitt et al. | |
| 6,357,161 B1 | 3/2002 | Best | |
| 6,412,209 B1 | 7/2002 | Kapraly et al. | |
| 6,412,210 B1 | 7/2002 | Horrell | |

* cited by examiner

Primary Examiner—Kurt Rowan
(74) Attorney, Agent, or Firm—Mary M. Lee

(57) ABSTRACT

A decoy, for simulating a waterfowl rotating to a feeding position. The body (10) houses a motor and torque enhanced axle (11), remote control receiver and switches (12) and battery (13) for intermittently rotating an axle with outer end (15), located outside the body, slid onto a decoy mounting post (20) that is fixed to the stand(16). Rotation of the axle causes the decoy to rotate vertical and horizontal, as well as causes the water in which the decoy is deployed to splash. The remote control receiver combined with the remote control transmitter (22) permits operator selectable durations of vertical or horizontal positioning. The decoy also has a unique fitting (15) and (20) as well as the line (18) for attachment to the stand (16), which allows for quick assembly and disassembly.

25 Claims, 4 Drawing Sheets

WATERFOWL FEEDING DECOY

CROSS-REFERENCE TO RELATED APPLICATIONS

Not applicable.

BACKGROUND—FIELD OF INVENTION

The present invention is generally directed to a decoy for luring waterfowl for hunting purposes, specifically to such a decoy that operates in either a feeding or floating position upon command by hunter.

BACKGROUND—DESCRIPTION OF PRIOR ART

Decoys are commonly employed by hunters to attract game birds such as geese and duck. In order to serve their purpose, it is most desirable if the decoy realistically simulates a goose, duck, or waterfowl to be attracted. In order to make decoys more lifelike, numerous attempts have been made to automate a decoy or provide moving parts to simulate a moving waterfowl.

Originally these decoys floated on the water with no movement. As hunters became more sophisticated they began searching for more realistic behaving decoys.

Thereafter, inventors created several types of decoys to attract waterfowl. U.S. Pat. No. 3,000,128 (McAda) shows a decoy having a battery powered propelling mechanism. This invention allows the decoy to appear swimming but does nothing to emulate feeding. U.S. Pat. No. 3,115,721 (Story) shows a feeder duck decoy having feet that are moved by the force of the waves of the water but it has no motorized capability and limits its position to a vertical feeding position only.

Several types of decoys utilize radio control and motorized decoys. U.S. Pat. No. 3,689,927 (Boston) includes the use of a radio receiver, positioned within a waterfowl decoy, to receive signals from a remote radio transmitter. The remote control can be used to operate an underwater propeller and rudder for directing the course of the decoy. But again this decoy limits its movement to swimming only. U.S. Pat. No. 4,566,214 (McCrory, et al.) discloses a battery operated feeder duck decoy. A motor, weights, and coupling are utilized to impart rotational motion to the decoy. This motion causes the water about the decoy to ripple. Although this decoy is motorized, it does not have remote control capability, and its movement is limited to a full time vertical position. U.S. Pat. No. 5,377,439 (Roos, et al.) discloses a remotely controlled decoy having a rudder that is responsive to electrical controls signals. By controlling the rudder, an operator is able to provide directed locomotion for the buoyant body of the decoy. Once again, a decoy limited to simulating a swimming activity.

Some decoys simulate motion by using air. One such decoy is disclosed in U.S. Pat. No. 5,566,491, entitled "Method and Apparatus for Animating a Floating Waterfowl Decoy." In one embodiment of that invention air is forced through a plastic tube and the air is released underneath the floating decoy. The bubbles create rings and waves around the decoy and simulate movement. Another such decoy is disclosed in U.S. Pat. No. 6,088,944 entitled "Simulated feeding decoy." In one embodiment of this invention it utilizes an air compressor to facilitated the drive mechanism.

While numerous attempts have been made to provide a decoy that simulates a live waterfowl, the need continues to exist for a decoy that simulates normal waterfowl in a lifelike manner. The prior art does not disclose a combination of features evident in the present decoy. None of the above inventions and patents, taken either singularly or in combination, is seen to describe the instant invention as claimed. Thus, a waterfowl feeding decoy that is affordable, light weight, convenient to set-up, easy to operate and effective solves the aforementioned problems is desired.

SUMMARY

This invention relates generally to waterfowl decoys for use by hunters. More specifically, the invention is a model decoy mounted on stand and having the motorized ability to rotate forward and backward from a horizontal floating position to a vertical feeding position by the hunter using a remote control transmitter.

The remote control can be activated at will and maintain either the vertical feeding position or horizontal position as long as desired. The motor and remote control receiver is located in the cavity of the decoy. The receiver and motor are direct current operating on a rechargeable or discardable battery. The transmitter for the remote control is two button or more and is battery operated.

The stand is to be fixed to the earthen bottom of the body of water and positioned to where the decoy, when connected, is horizontal with its underside resting flush to the body of water. The stand has a horizontal stop arm extending off the stand so that when the motor is activated it stops the rotation of the decoy in a vertical or feeding position. In addition, a flexible line is connected to the decoy and the arm. When the decoy is remote activated to assume the horizontal position, the line becomes tight and the decoy then rests in the horizontal or floating position.

OBJECTS AND ADVANTAGES

Accordingly, besides the objects and advantages of the decoy described in my above patent, several objects and advantages of the present invention are:

(a) to provide a realistic waterfowl decoy that effectively attracts other waterfowl to the vicinity.

(b) to provide a motorized feeding and floating motion that creates water movement and drawing even more attention to a realistic portrayal of waterfowl behavior.

(b) to provide sufficient water movement that it helps keep ice from forming during freezing conditions, which assists to entice waterfowl to approach the desired area.

(c) to provide improved elements and arrangements thereof for the purposes described in a waterfowl decoy that is relatively inexpensive, dependable and fully effective in accomplishing its intended purposes.

These and other objects of the present invention will become readily apparent upon further review of the following specification and drawings.

DRAWING FIGURES

REFERENCE NUMERALS IN DRAWINGS

| | |
|---|---|
| 10 decoy housing | 11 motor |
| 12 remote control receiver and switches | 13 power source |
| 14 decoy cavity | 15 motor axle |
| 16 stand | 17 vertical stop arm |
| 18 flexible line | 20 decoy mounting post |
| 22 remote control transmitter | 23 water transfer holes |
| 24 water surface | 26 battery access panel |

DESCRIPTION—FIGS. 1–5

The present invention is a motorized waterfowl decoy device and assembly having the ability to rotate on center axis, mounted on a stand such that the waterfowl feeding decoy appears to be feeding at random.

Figure 1:
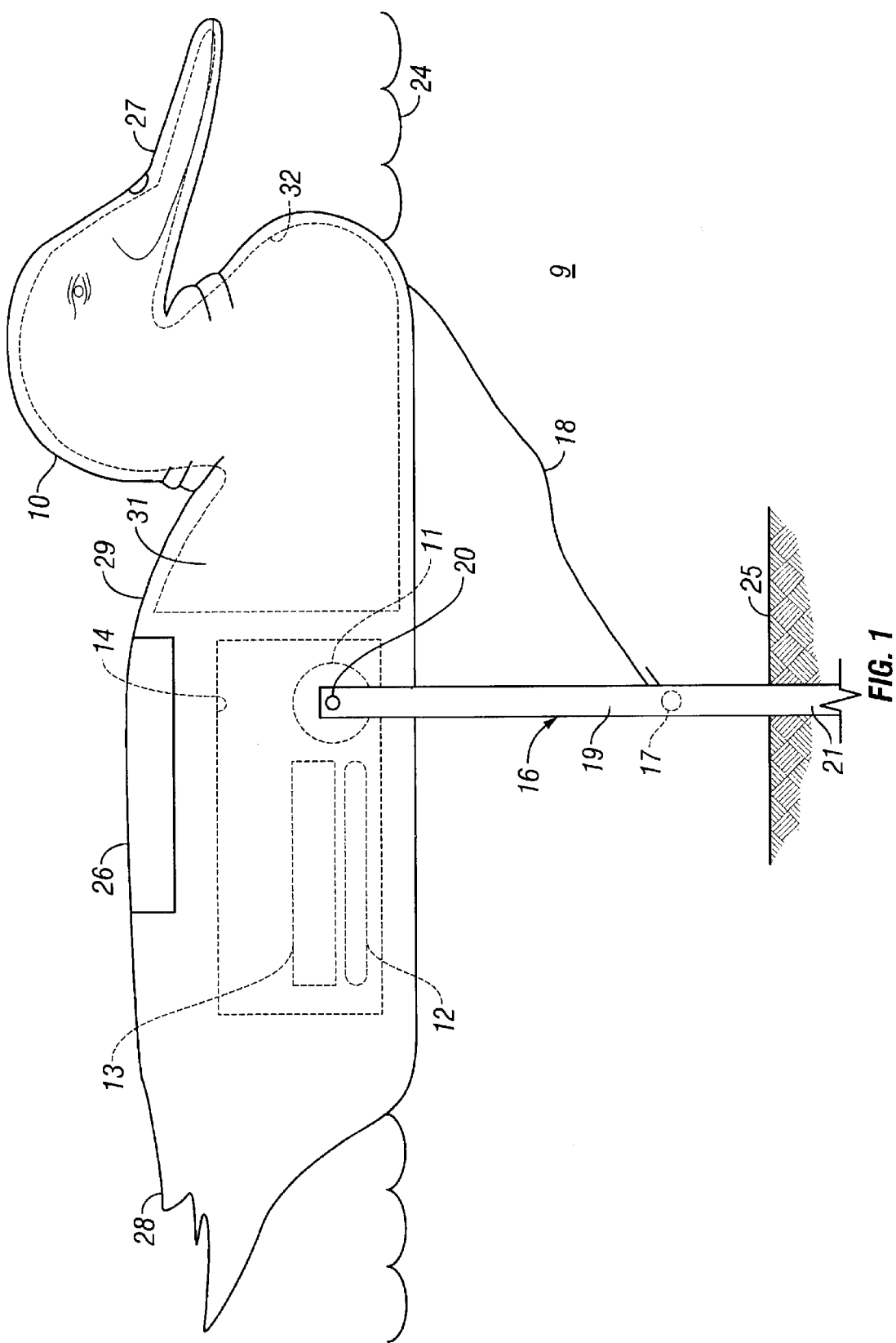
FIG. 1 is a side view of waterfowl feeding decoy in a horizontal or simulated floating position, showing decoy, stand, motor, power source, remote control receiver and battery access panel.
Figure 2:
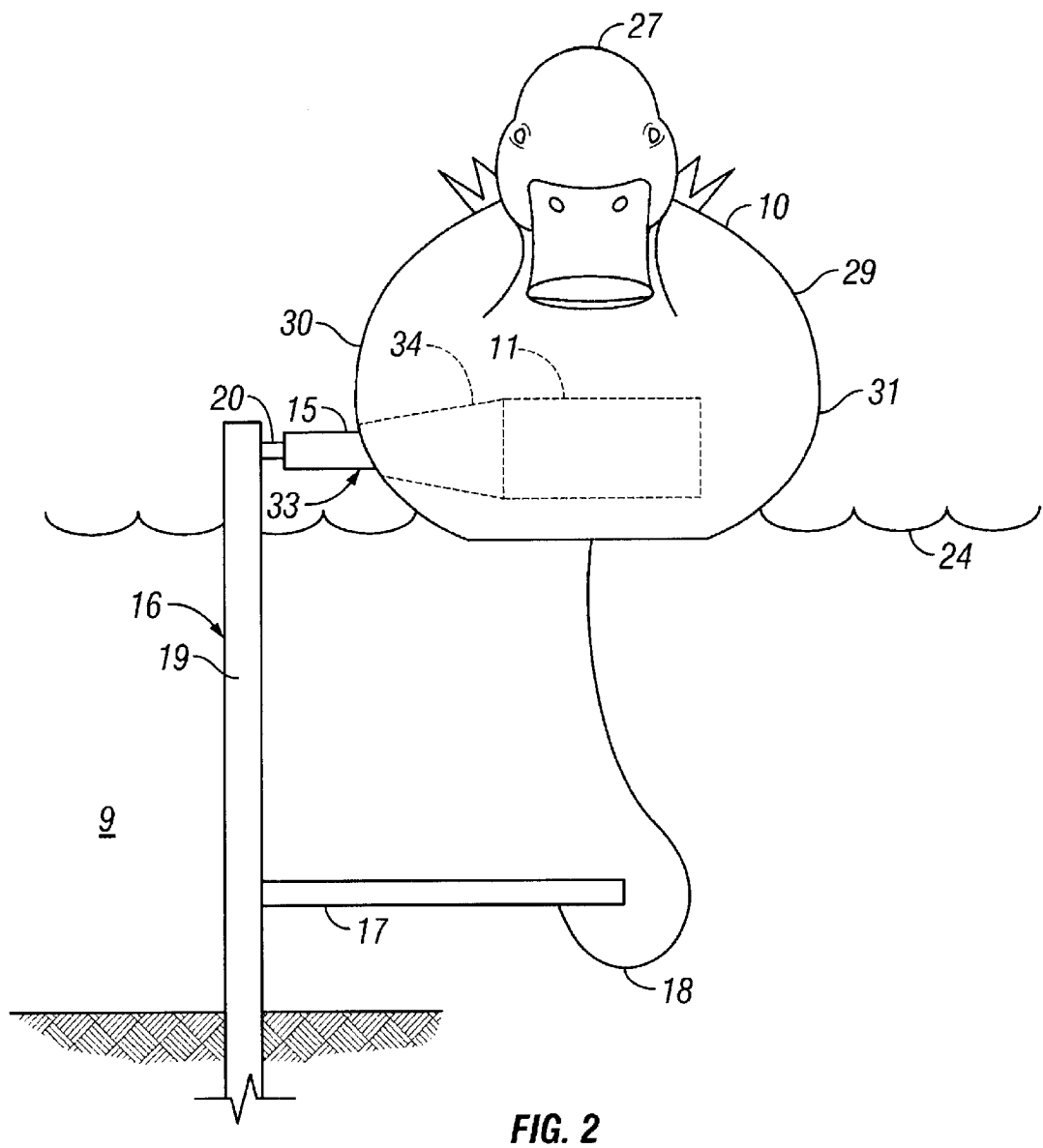
FIG. 2 is a front view of decoy body, showing a view of the mounting connection for decoy motor shaft and stand.

FIG. 1 is a perspective view of the preferred waterfowl decoy housing 10, and a means for oscillating the device in a body of water 9. As shown in FIGS. 1 and 2, the decoy housing 10 comprises a head 27 and a tail end 28 with a body 29 therebetween, the body having two sides 30 and 31. FIG. 1 shows a motor 11, a remote control receiver and switches 12, a power source 13 enclosed within the cavity 14 of the decoy 10, and sitting horizontally on the surface 24 of a body of water 9. Decoy housing is preferably made from hard plastic or other suitable strong, yet light weight material. A first female axle member in the form of a sleeve 15 (FIG. 2) is operatively attached to the motor 11 and protrudes from the decoy housing 10 to removably connect to the male axle member in the form of a rod 20 extending from the stand 16, the rod 20 shaped to be slidably received in the sleeve 15.

FIG. 2 is a front view of the preferred waterfowl decoy housing 10 setting horizontally on the surface 24 of water 9, an axle assembly 33 adapted to movably support the decoy housing on the stand 16 and to provide quick assembly and disassembly of the housing and the stand. The axle assembly 33 extends horizontally between only one side 31 of the decoy housing 10 and the vertical post 19. Preferably, the axle assembly 33 includes a first axle member operatively connected to the motor and extending from the housing, and a second axle member rotatably and removably connectable to the first axle member and extending from the stand 16 a distance from the bottom end 21. The first axle member may be a female motor axle 15 in the form of a sleeve which slidably receives a second male axle member in the form of a rod 20, which is permanently fixed to stand 16. Female motor axle 15 and male axle rod 20 both preferably made of hardened steel, aluminum, hardened plastic or other suitable material. Preferably, the axle assembly 33 is torque-enhanced, such as by a suitable gear mechanism 34. Stand 16 is made preferably of steel tubing, hardened plastic or some other strong and light weight material suitable of supporting the weight and thrust of the decoy while decoy is mounted and the bottom end 21 of the vertical post 19 is positioned firmly in earthen bottom 25 of the body of water.

FIG. 2 shows a mounted arm of stand 16 labeled as vertical stop arm 17. Also illustrated is the flexible line 18, connected to vertical stop arm 17 and decoy housing 10. The flexible line 18 when tight limits the decoy housing 10 to a horizontal position but allows flexible movement of decoy housing 10 to assume a vertical position.

Figure 3:
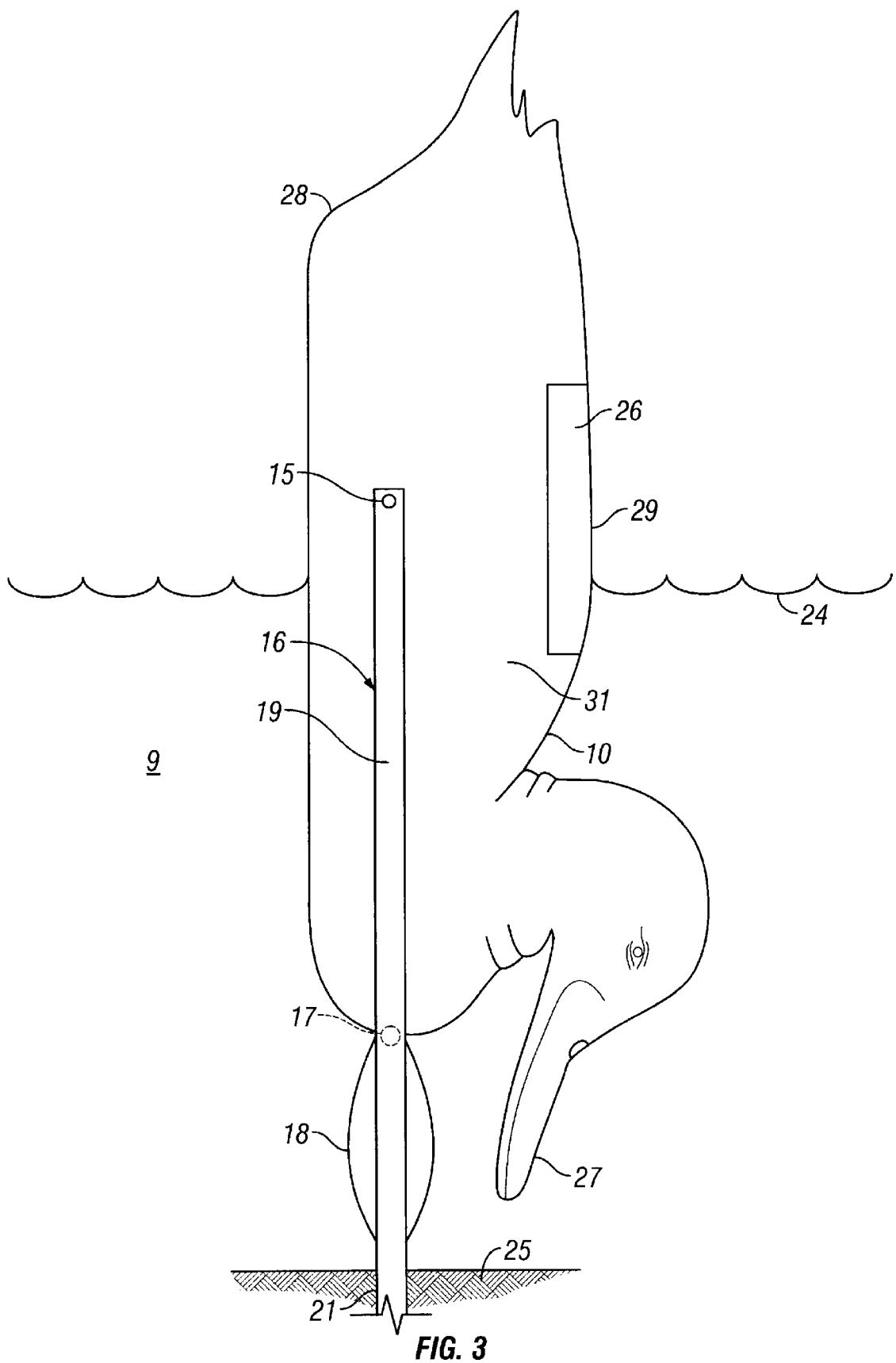
FIG. 3 is an environmental perspective of waterfowl feeding decoy in a vertical or feeding position, showing decoy and stand.

FIG. 3 illustrates the decoy in a vertical position where the decoy housing 10 rests against the vertical stop arm 17 and flexible line 18 lying limp with slack.

FIG. 1 shows a decoy housing 10 with enclosed motor 11, power source 13 and a remote control receiver and switches 12. Motor 11 is direct current functional with sufficient torque, so called "high torque motor," to move the decoy 10 from a horizontal to a vertical position and back again to a horizontal position. The power source 13 is preferably a 6 to 12 volt rechargeable battery. The remote control receiver 12 is preferably adequate to receive a wireless control signal from a minimum of 40 feet and activate the motor 11 in response to the control signal in a forward or reverse direction. The combination of motor 11, remote control receiver with switches 12 and power source 13 are enclosed in the rear decoy cavity 14 that is preferably water tight but accessible to the operator 26 through a flap or door 26.

Figure 4:
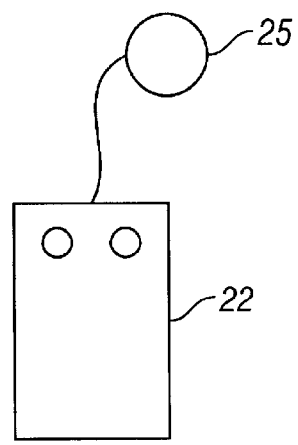
FIG. 4 is a front view of the remote control transmitter with two button selectors for both vertical and horizontal and key chain type lanyard attachment.

FIG. 4 shows a two-button remoter control transmitter 22 outside and separate from the housing and adapted to transmit a wireless control signal to the receiver 12. The transmitter 22 is battery operated, preferably rain proof, two button functions forward and reverse and key chain type lanyard connector. The transmitter 22 preferably has a minimum range of 40 feet.

Figure 5:
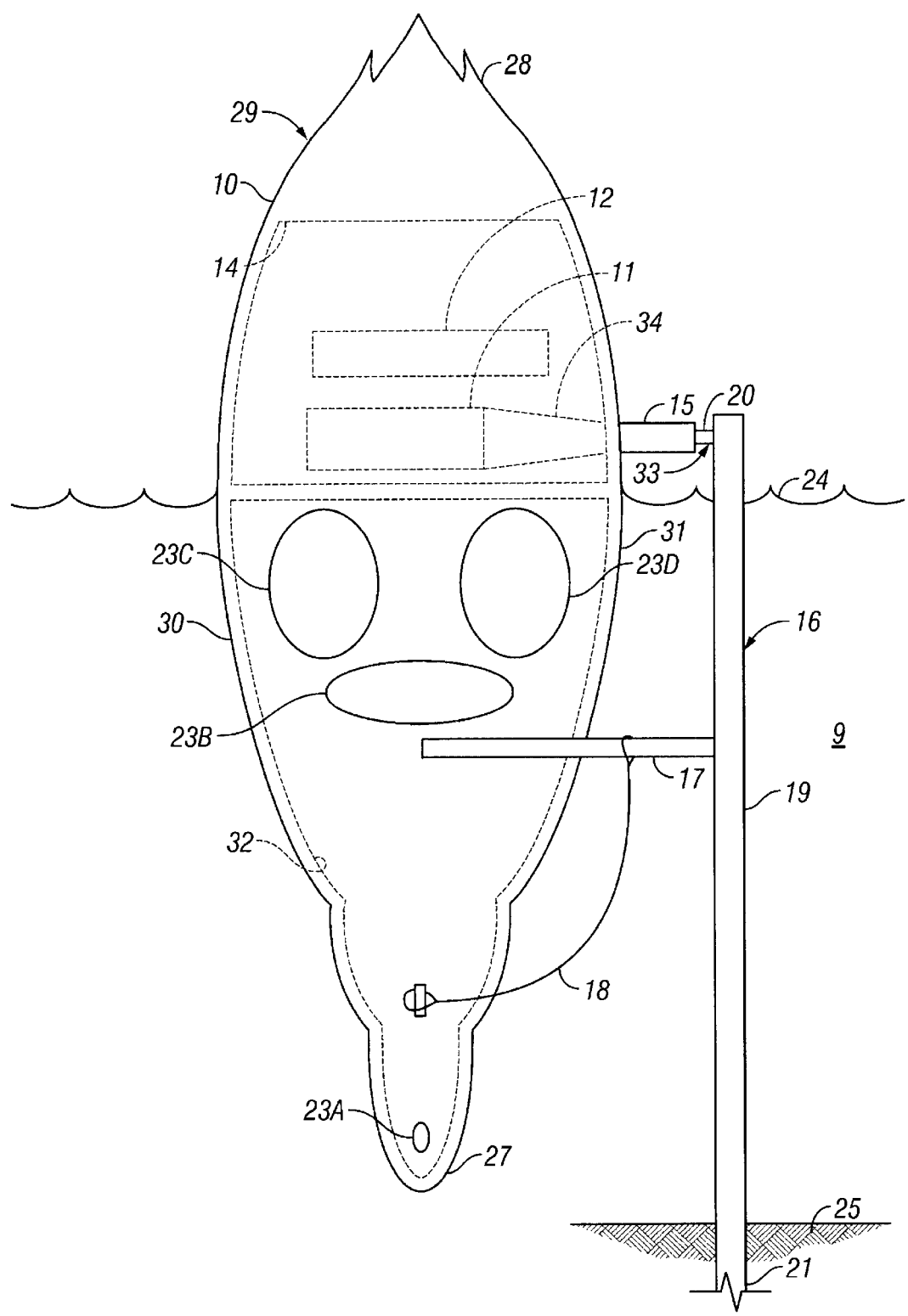
FIG. 5 is a bottom view of the waterfowl feeding decoy in a vertical position and illustrates the air and water pass through holes created in the bottom of the decoy.

FIG. 5 shows the bottom of decoy housing 10 in a vertical position. This illustration shows openings 23A–23B in the bottom of decoy housing 10 to allow free movement of water and air in and out of the forward internal cavity 32 as the decoy is motor driven forward to a vertical position and reverse to a horizontal position. The openings include an opening 23A near the head 27 of the housing 10 and an opening on the bottom of the body 29 of the housing.

Advantages

From the description above, a number of advantages of my waterfowl feeding decoy become evident:

(a) The presence of the waterfowl feeding decoy will provide superior movement and simulation of a true feeding waterfowl, luring waterfowl for hunting purposes.

(b) The presence of the waterfowl rotating from horizontal to vertical upon activation of the remote control will allow activation during optimal times for luring.

(c) The rotation from horizontal to vertical will cause motion of both decoy and water. This movement not only attracts waterfowl but deters formation of ice on the surface of water during freezing conditions. The open water can be an essential element in attracting waterfowl.

(d) The waterfowl decoy is light weight and portable.

(e) The waterfowl decoy is easy to set-up and easy to operate.

Operation—FIGS. 1–5

First, the bottom end 21 of the stand 16 is pushed into the earthen bottom 25 of a body of water 9. Next, the female axle member 15 on the waterfowl feeding decoy housing 10 is attached to the male axle member 20 extending from the stand 16 so that the decoy housing 10 is flush with the surface 24 of the body of water 9. Next, the flexible line 18 is attached to both the vertical stop arm 17 and decoy 10. When the remote control transmitter 22 is activated, the decoy 10 will move from a horizontal position to a vertical position upon command in such a way the waterfowl feeding decoy provides the appearance of a live feeding waterfowl.

As the housing 10 rotates up to the horizontal floating position (FIGS. 1 & 2) from the vertical feeding position (FIGS. 3 & 5), air can enter the cavity 32 through the head opening 23A and allow water to exit the cavity through the body openings 23B–D, and so that as the housing rotates down from the horizontal floating position to the vertical feeding position, air can exit the cavity through the body openings and allow water to enter the cavity through the head opening.

Conclusion, Ramifications, and Scope

Accordingly, the reader will see that the waterfowl feeding decoy of this invention can be used to attract waterfowl. The stand can easily be placed in a earthen bottom body of water. The decoy is quickly attached to the stand by sliding motor shaft onto the mounting post and connecting the flexible line to the vertical stop arm.

Once mounted the waterfowl feeding decoy can be activated to rotate either vertical or horizontal by pushing the corresponding button on the radio control transmitter.

In the event waterfowl approaches the area the hunter can begin activation of the water fowl decoy. When there are no waterfowl in the area, the hunter can leave the waterfowl decoy idle thereby conserving its power source. Furthermore, the waterfowl feeding decoy has the additional advantages in that it permits the use of a rechargeable power source;

it is compact and easily transported with other decoys in decoy bag;

it is durable and designed to withstand years of use.

Although the description above contains many specificities, these should not be construed as limiting the scope of the invention but as merely providing illustrations of some of the presently preferred embodiments of this invention. For example, the decoy can be a duck, goose or other wild game; the mounting post can be clamped, screwed or bolted; the stand can be varied in length, etc.

Thus, the scope of the invention should be determined by the appended claims and their legal equivalents, rather than by the examples given.

I claim:

1. A waterfowl decoy assembly for use in a body of water having a bottom and a surface, the assembly comprising:

a housing shaped like a waterfowl;

a first axle member supported in the housing for rotation;

a motor in the housing adapted to drive rotation of the first axle member in a forward direction and in a reverse direction; and a power source in the housing for energizing the motor; and a stand having a second axle member and an end supportable in the body of water;

wherein the first axle member of the housing is removably and nonrotatably supportable on the second axle member of the stand for movement of the housing at the surface of the water between a horizontal floating position and a vertical feeding position.

2. The waterfowl decoy assembly of claim 1 wherein the decoy housing includes a head and a body, wherein the decoy housing defines an internal cavity extending from the head to at least a portion of the body, wherein the housing has openings whereby air and water can enter and exit the cavity, wherein the openings include an opening near the head and an opening on the bottom of the body of the decoy housing, so that as the housing rotates up to the horizontal floating position from the vertical feeding position, air can enter the cavity through the head opening and allow water to exit the cavity through the body opening, and so that as the housing rotates down from the horizontal floating position to the vertical feeding position, air can exit the cavity through the body opening and allow water to enter the cavity through the head opening.

3. The waterfowl decoy assembly of claim 2 further comprising:

a receiver in the housing adapted to receive a forward control signal and a reverse control signal and to activate the motor in a forward direction in response to a forward control signal and to activate the motor in a reverse direction in response to a reverse control signal; and a transmitter separate from the housing and adapted to transmit to the receiver a forward control signal and a reverse control signal.

4. The waterfowl decoy assembly of claim 3 wherein the first axle is torque enhanced.

5. The waterfowl decoy assembly of claim 4 wherein the waterfowl-shaped decoy housing has a body with two sides, a head, and a tail end, wherein the first axle extends horizontally from only one side of the decoy housing.

6. The waterfowl decoy assembly of claim 5 further comprising a stop adapted to stop the forward movement of the decoy housing in the vertical feeding position.

7. The waterfowl decoy assembly of claim 6 further comprising a stop adapted to stop the reverse movement of the decoy housing in the horizontal feeding position.

8. The waterfowl decoy assembly of claim 3 wherein the waterfowl-shaped decoy housing has a body with two sides, a head, and a tail end, wherein the first axle extends horizontally from only one side of the decoy housing.

9. The waterfowl decoy assembly of claim 1 wherein the first axle is torque enhanced.

10. The waterfowl decoy assembly of claim 1 wherein the waterfowl-shaped decoy housing has a body with two sides, a head, and a tail end, wherein the first axle extends horizontally from only one side of the decoy housing.

11. The waterfowl decoy assembly of claim 10 further comprising:

a receiver in the housing adapted to receive a forward control signal and a reverse control signal and to activate the motor in a forward direction in response to a forward control signal and to activate the motor in a reverse direction in response to a reverse control signal; and a transmitter separate from the housing and adapted to transmit to the receiver a forward control signal and a reverse control signal.

12. The waterfowl decoy assembly of claim 1 wherein the first axle is torque enhanced.

13. The waterfowl decoy assembly of claim 11 wherein the decoy housing includes a head and a body, wherein the decoy housing defines an internal cavity extending from the head to at least a portion of the body, wherein the housing has openings whereby air and water can enter and exit the cavity, wherein the openings include an opening near the head and an opening on the bottom of the body of the decoy housing, so that as the housing rotates up to the horizontal floating position from the vertical feeding position, air can enter the cavity through the head opening and allow water to exit the cavity through the body opening, and so that as the housing rotates down from the horizontal floating position to the vertical feeding position, air can exit the cavity through the body opening and allow water to enter the cavity through the head opening.

14. The waterfowl decoy assembly of claim 10 wherein the decoy housing includes a head and a body, wherein the decoy housing defines an internal cavity extending from the head to at least a portion of the body, wherein the housing has openings whereby air and water can enter and exit the cavity, wherein the openings include an opening near the head and an opening on the bottom of the body of the decoy housing, so that as the housing rotates up to the horizontal floating position from the vertical feeding position, air can enter the cavity through the head opening and allow water to exit the cavity through the body opening, and so that as the housing rotates down from the horizontal floating position to the vertical feeding position, air can exit the cavity through the body opening and allow water to enter the cavity through the head opening.

15. The waterfowl decoy assembly of claim 1 wherein the first axle is torque enhanced.

16. The waterfowl decoy assembly of claim 1 further comprising:
   a receiver in the housing adapted to receive a forward control signal and a reverse control signal and to activate the motor in a forward direction in response to a forward control signal and to activate the motor in a reverse direction in response to a reverse control signal; and
   a transmitter separate from the housing and adapted to transmit to the receiver a forward control signal and a reverse control signal.

17. The waterfowl decoy assembly of claim 1 wherein the first axle comprises a female member and the second axle member comprises a male axle member receivable in the female axle member.

18. The waterfowl decoy assembly of claim 1 wherein the power source comprises a battery.

19. The waterfowl decoy assembly of claim 1 wherein the stand comprises a vertical post with a bottom end, wherein the end of the stand is the bottom end of the vertical post, and wherein the bottom end is adapted to be positioned in the bottom of the body of water.

20. The waterfowl decoy assembly of claim 1 wherein the stand comprises a vertical post with a bottom end, wherein the end of the stand is the bottom end of the vertical post, and wherein the bottom end is adapted to be positioned in the bottom of the body of water.

21. A waterfowl decoy assembly for use in a body of water having a surface and a bottom, the decoy comprising:
   a waterfowl decoy housing shaped like a waterfowl to have a head, a tail end and a body with two sides;
   a stand having an end adapted to be positioned in the body of water; and
   an axle assembly adapted to removably connect the decoy housing to the stand near the surface of the body of water and to movably support the decoy housing for movement between a horizontal floating position and a vertical feeding position, wherein the axle assembly extends between the stand and only one side of the decoy housings;
   wherein the decoy housing defines an internal cavity extending from the head to at least a portion of the body, wherein the housing has openings whereby air and water can enter and exit the cavity, wherein the openings include an opening near the head and an opening on the bottom of the body of the decoy housing, so that as the housing rotates up to the horizontal floating position from the vertical feeding position, air can enter the cavity through the head opening and allow water to exit the cavity through the body opening, and so that as the housing rotates down from the horizontal floating position to the vertical feeding position, air can exit the cavity through the body opening and allow water to enter the cavity through the head opening.

22. The waterfowl decoy assembly of claim 21 wherein the axle assembly comprises a female axle member and a male axle member receivable in the female axle member.

23. The waterfowl decoy assembly of claim 21, wherein the axle assembly is adapted to movably support the decoy housing for forward movement from the horizontal floating position to the vertical feeding position, and wherein the waterfowl decoy assembly further comprises a stop adapted to stop the forward movement of the decoy housing in the vertical feeding position.

24. The waterfowl decoy assembly of claim 23, wherein the axle assembly is further adapted to movably support the decoy housing for reverse movement from the vertical feeding position to the horizontal floating position, and wherein the waterfowl decoy assembly further comprises a stop adapted to stop the reverse movement of the decoy housing in the horizontal floating position.

25. The waterfowl decoy assembly of claim 21, wherein the axle assembly is adapted to movably support the decoy housing for reverse movement from the vertical feeding position to the horizontal floating position, and wherein the waterfowl decoy assembly further comprises a stop adapted to stop the reverse movement of the decoy housing in the horizontal floating position.

\* \* \* \* \*